United States Patent
Pursifull et al.

(10) Patent No.: US 6,899,080 B2
(45) Date of Patent: May 31, 2005

(54) METHOD AND SYSTEM FOR SELECTING BETWEEN TWO SENSOR OUTPUT SIGNALS IN AN ELECTRONIC THROTTLE SYSTEM

(75) Inventors: Ross Dykstra Pursifull, Dearborn, MI (US); Robert James Wilker, Macomb, MI (US); Charles Francis Weber, Dexter, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 268 days.

(21) Appl. No.: 10/194,635

(22) Filed: Jul. 13, 2002

(65) Prior Publication Data
US 2004/0007207 A1 Jan. 15, 2004

(51) Int. Cl.$^7$ .................................. F02D 9/00
(52) U.S. Cl. ........................................ 123/399
(58) Field of Search ........................ 123/399, 319, 123/395, 198 D

(56) References Cited

U.S. PATENT DOCUMENTS

| | | | |
|---|---|---|---|
| 5,170,769 A | 12/1992 | Berger et al. | |
| 5,193,506 A | * 3/1993 | Ironside et al. | ............. 123/399 |
| 5,224,453 A | 7/1993 | Bederna et al. | |
| 5,320,076 A | 6/1994 | Reppich et al. | |
| 5,339,782 A | 8/1994 | Gulzer et al. | |
| 5,436,826 A | 7/1995 | O'Flarity | |
| 5,476,078 A | 12/1995 | Pfalzgraf et al. | |
| 5,654,888 A | 8/1997 | Muller et al. | |
| 5,669,353 A | 9/1997 | Shirai et al. | |
| 5,950,597 A | 9/1999 | Kamio et al. | |
| 5,983,860 A | 11/1999 | Kitamura et al. | |
| 6,109,239 A | 8/2000 | Watanabe | |
| 6,276,332 B1 | 8/2001 | Storhok et al. | |

FOREIGN PATENT DOCUMENTS

| | | |
|---|---|---|
| EP | 0 653 690 A1 | 5/1995 |
| GB | 2 242 037 A | 9/1991 |

* cited by examiner

Primary Examiner—Bibhu Mohanty
(74) Attorney, Agent, or Firm—John E. Kajander

(57) ABSTRACT

A method and system for selecting one of a plurality of voltage signals generated by a plurality of sensors in response to a common sensor input. The method determines which sensor to use based on a comparison the of the output of the sensors to each other and to known values.

14 Claims, 3 Drawing Sheets

METHOD AND SYSTEM FOR SELECTING BETWEEN TWO SENSOR OUTPUT SIGNALS IN AN ELECTRONIC THROTTLE SYSTEM

BACKGROUND OF THE INVENTION

1. Field of the Invention

The invention relates to methods and systems for "arbitrating" between two sensor output signals in order to select and apply a preferred output for use in a signal processing operation in an electronic throttle system.

2. Background Art

The prior art often teaches use of a plurality of sensors generating respective outputs in response to a common input in order to provide "redundant" signals for use in a subsequent signal processing operation. For example, the prior art teaches use of three sensors measuring the identical property, each generating a respective output in response to the common input, whereupon a controller compares the respective outputs and "rejects" the output that least resembles the others and using one of or averaging the remaining outputs. In this manner, the sensors are said to "vote" for a given representation of the common input, with the majority "winning" the vote.

In order to reduce the costs associated with providing plural redundant sensors, the prior art alternatively deploys sensors in pairs to thereby generate a primary signal and a secondary signal, each similarly responsive to the common input, for use in a subsequent signal processing operation. A controller is programmed to utilize the primary signal as long as it remains "plausible," with the secondary signal being available for use once the "plausibility" of the primary signal becomes suspect. In its simplest form, the plausibility check of the primary signal may constitute a signal range check, wherein the primary signal is compared to a range of outputs permitted to be associated with an operable primary sensor, with the primary signal being used in the subsequent signal processing operation so long as it remains within the predetermined range. Unfortunately, because the secondary signal is used exclusively when the primary output is deemed "implausible," a system returning to such exclusive use of the secondary signal becomes susceptible to an operational fault in connection with the secondary sensor.

In a known improvement of the latter approach, an in-range check is also performed on the secondary signal and, if both the primary and secondary signals are "in range," the plausibility of the primary signal is further tested by comparing the primary output with the secondary signal. In response to the comparison, the primary signal is selected for use in subsequent signal processing so long as the primary and secondary signals are within a prescribed tolerance band with respect to one another. If the primary and secondary signals are not within the prescribed tolerance band of one another, the system adopts a "failure" response characterized by limited system operation. Thus, for example, where this approach is used to select one of the generated outputs from a pair of throttle plate position sensors as a feedback control signal to an engine's electronic throttle control system, the engine goes to a reduced-output "failure" operating condition either when one output is outside of its respective range, or when the difference between "in-range" signals is nonetheless outside of the predetermined tolerance band. Using the failure position means that some throttle availability is lost because the throttle is at a fixed position. Alternatively, the system may resort to using the highest indicating sensor. Using the highest indicating sensor may result in the throttle being run shut and potentially causing an the engine to stall for some failure modes.

It will be appreciated, however, that the dual requirements of "in-range" and "in-tolerance" may force a "failure" operation even when one of the two sensors remains fully operational.

SUMMARY OF THE INVENTION

The present invention overcomes the above disadvantages by providing a control method capable of arbitrating between a pair of sensor-generated output signals so that an errant sensor can be isolated, and the subsequent control process adjusted.

The invention includes a method of providing a feedback control signal of a throttle valve. The method includes providing first and second throttle position sensors having a common input. The first and second sensors have first and second outputs. The appropriate output sensor is selected by comparing the output signals of the first and second sensors to each other and to a known default position.

The invention also includes a system for providing a feedback control signal for an electronic throttle. The system includes a first sensor having an input signal corresponding to a throttle position. The first sensor has a first output. The system also has a second sensor having an input signal corresponding to the throttle position. The second sensor has a second output. The system also includes control processor electrically connected to the first and second sensors. The control processor is capable of selecting the appropriate feedback control sensor by comparing the output of the sensors to each other and to a known default position.

The above objects and other objects, features and advantages of the invention are more readily understood from a review of the attached drawings and the accompanying specification and claims.

DETAILED DESCRIPTION OF THE PREFERRED EMBODIMENT

Figure 1:
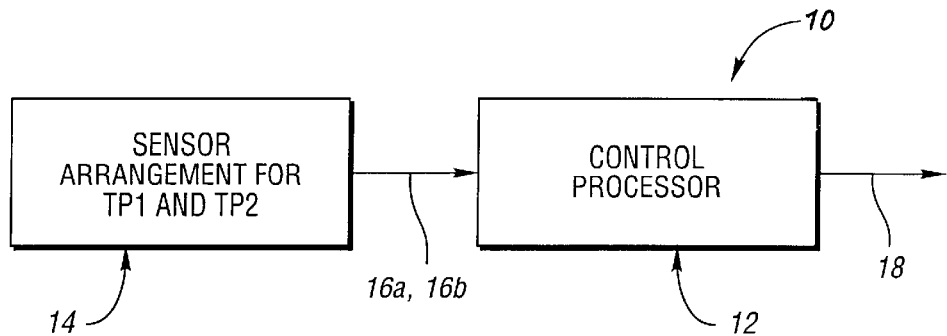
FIG. 1 is block diagram of an electronic throttle control system in an electronic control module in accordance with the present invention.

FIG. 1 illustrates an electronic throttle control system 10 in accordance with an exemplary embodiment of the invention. A control processor 12 is coupled to a sensor arrangement 14 having at least two throttle plate position sensors TP1 and TP2. These sensors each produce a separate output signal 16a, 16b. Signals 16a, 16b are indicative of the angle of a throttle valve plate (not shown) in response to the depression of an accelerator pedal (not shown) . Each throttle plate position sensor TP1, TP2 can be arranged in accordance with known design techniques to produce a desired output.

Control processor 12 includes suitable programming to process the sensor output signals 16a, 16b to generate one or more feedback control or monitoring signals 18. The programming and control signals 18 are derived in accordance with an engine control system for controlling movement of the throttle plate to a desired position.

Figure 2A:
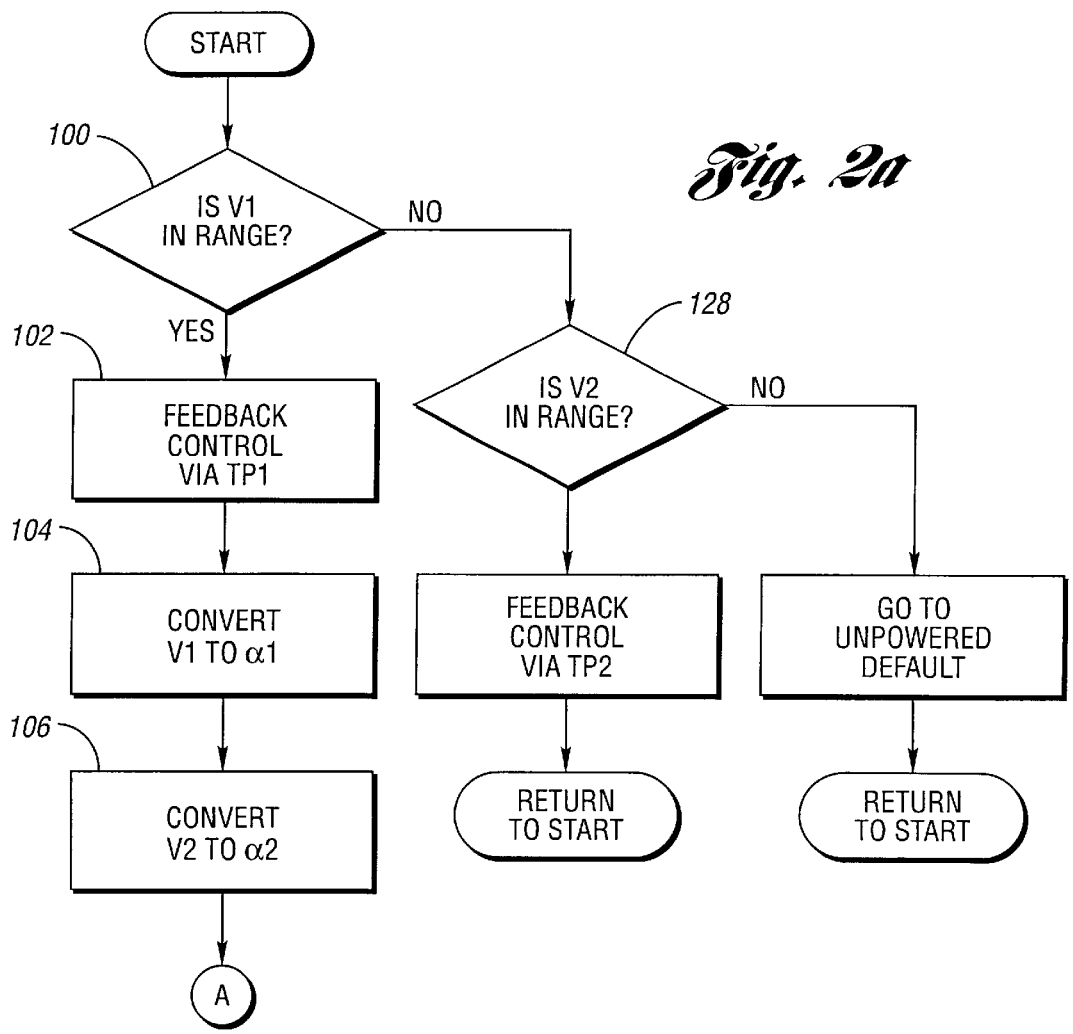
FIG. 2 is a flowchart illustrating a process for providing arbitration between multiple position sensors in response to an errant sensor output in accordance with the invention.
Figure 2B:
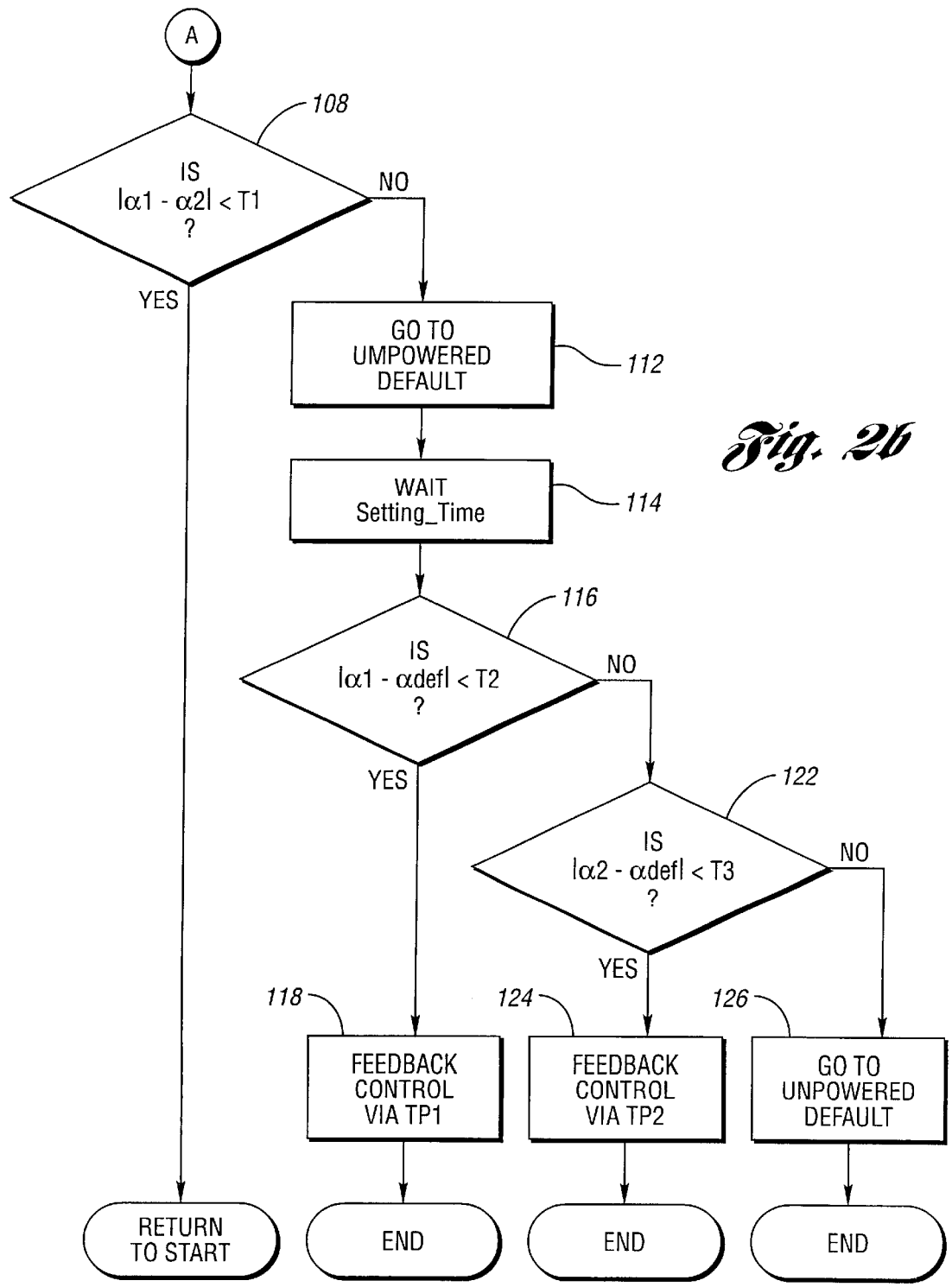

Referring now to FIG. 2, a flow chart illustrates one exemplary method of selecting between two sensor outputs in accordance with the invention. Specifically, as denoted at block 100, a determination is made as to whether an output signal voltage V1 of the first position sensor TP1 is within a normal or predetermined desired range of operation. The range of operation is generally 0.25 to 4.75 volts. As denoted at block 102, if the output signal 16a is within the normal or desired range, the system selects and applies the output of the first position sensor TP1 feedback control signal 18. If the output signal 16a is outside of the range, then the first position sensor is considered errant as discussed below.

Though not necessary at this point, a determination can be made to see if output signal 16b voltage V2 of the second position sensor TP2 is within a normal or desired range of operation.

At block 104, the first position sensor TP1 measurement signal 16a may be converted by the control processor 12 or other controller to a value, i.e., the first sensor angle α1, indicative of the corresponding angle of the throttle valve plate as measured by the first position sensor TP1. At block 106, the same conversion process is carried out for the second position sensor measurement signal 16b voltage V2 to obtain a second determined output angle α2 indicative of the current throttle angle α of the throttle plate as measured by the second position sensor TP2. Alternatively, the output signals 16a, 16b may be directly compared to each other without converting the output signals to angles α1, α2.

Then, at block 108, the controller 12 calculates a first absolute value of the difference between the first and second determined output angles α1 and α2 for comparison with a first predetermined threshold T1 to see if the sensors agree with each other. T1 is preferably approximately 7 degrees, i.e., the sensors must agree with each other within 7 degrees. If the first absolute value of the difference between the first and second determined output angles α1 and α2 is not greater than the first predetermined threshold T1, i.e., the sensors agree with each other, the controller selects and applies the first determined output angle a1 generated by the first or primary throttle position sensor TP1 for use in the subsequent signal processing operation, and the process returns to the start block. If, however, the first absolute value of the difference between the first and second determined output angles α1 and α2 is greater than the first predetermined threshold T1, i.e., the sensors disagree with each other, the controller proceeds to block 112 of FIG. 2 to determine which position sensor TP1, TP2 is errant.

The control process initiates a known predetermined unpowered default throttle plate control process to determine reference point at block 112. After waiting a predetermined settling time at block 114, the process determines at block 116 whether the absolute value of the difference between the first determined output angle of the first sensor angle α1 and an angle αdef corresponding to a known position of the throttle plate within the throttle body is less than a second predetermined difference threshold value T2. The default angle αdef is a third piece of known information that allows the system to apply a "voting" strategy to select the good sensor. The default position is preferably a position between the fully open and fully closed positions. However, the default position, may also be the fully open or fully close position and may be powered.

Typically, the settling time of block 114 is approximately 200 milliseconds although that time can vary for different components and situations.

If the absolute difference between first predetermined output angle α1 and the default angle αdef is less than the second predetermined threshold value T2, i.e.,the sensor shows the correct angle when compared to a known angle, then the system selects and applies feedback via the first position sensor TP1 as shown in block 118. The errant sensor is determined to be TP2. The control process stops at this point.

However, if the measured angle the first sensor angle α1 is greater than the second predetermined difference threshold T2, i.e., the sensor is not within an acceptable range compared to a known default, a determination is made at block 122 to determine whether the absolute value of the difference between the second determined output angle α2 and the default angle αdef is less than a third predetermined difference threshold value T3. If so, the errant sensor is determined to be the first position sensor TP1, and the system selects and applies feedback using the output of the second position sensor TP2 at block 124. The process stops at this point because it would be unproductive to continue checking for bad sensors when it has been determined that the first position sensor TP1 is errant.

Preferably, T2 and T3 are approximately 3 degrees.

On the other hand, if the absolute value of the difference between the second determined angle α2 and an angle αdef corresponding to the default value is not less than the third threshold value T3, a possible fault condition is indicated with respect to both the first and second position sensors TP1, TP2, and the system selects and applies the default angle αdef as the feedback control signal. The process may then end (as shown) or return to the start block. It is to be understood that any return from an unpowered default operation can include adjusting values using a suitable ramp-in function. Similarly, the feedback control can be based on the fully open or fully closed position.

Referring back to block 100, if the output voltage V1 of the first position sensor TP1 is not within range, i.e., the sensor may be bad, the process then determines at block 128 whether the output voltage V2 of the second position sensor TP2 is within a normal or desired range of operation. If so, the system selects and applies the feedback control signal 18 using the output of second position sensor TP2. The process then returns to the start block where the first position sensor TP1 is reevaluated to determine if it is within range. Alternatively, the process may stop and continue using the in-range sensor.

If the output of the second position sensor is also out of range, then the system proceeds to the unpowered default state. The process may stop or repeat to determine if a sensor becomes useable again.

The algorithm generally continuously repeats every 2 milliseconds if the sensors are in range and in agreement with each other. If, however, the system has to wait at block 114, then the cycle time will be longer. Further, if the system detects an errant sensor and proceeds to, for example, blocks 118 or 124, the system may cycle at longer intervals or remain at that state until the next vehicle start since it has already determined the errant sensor.

Figure 3:
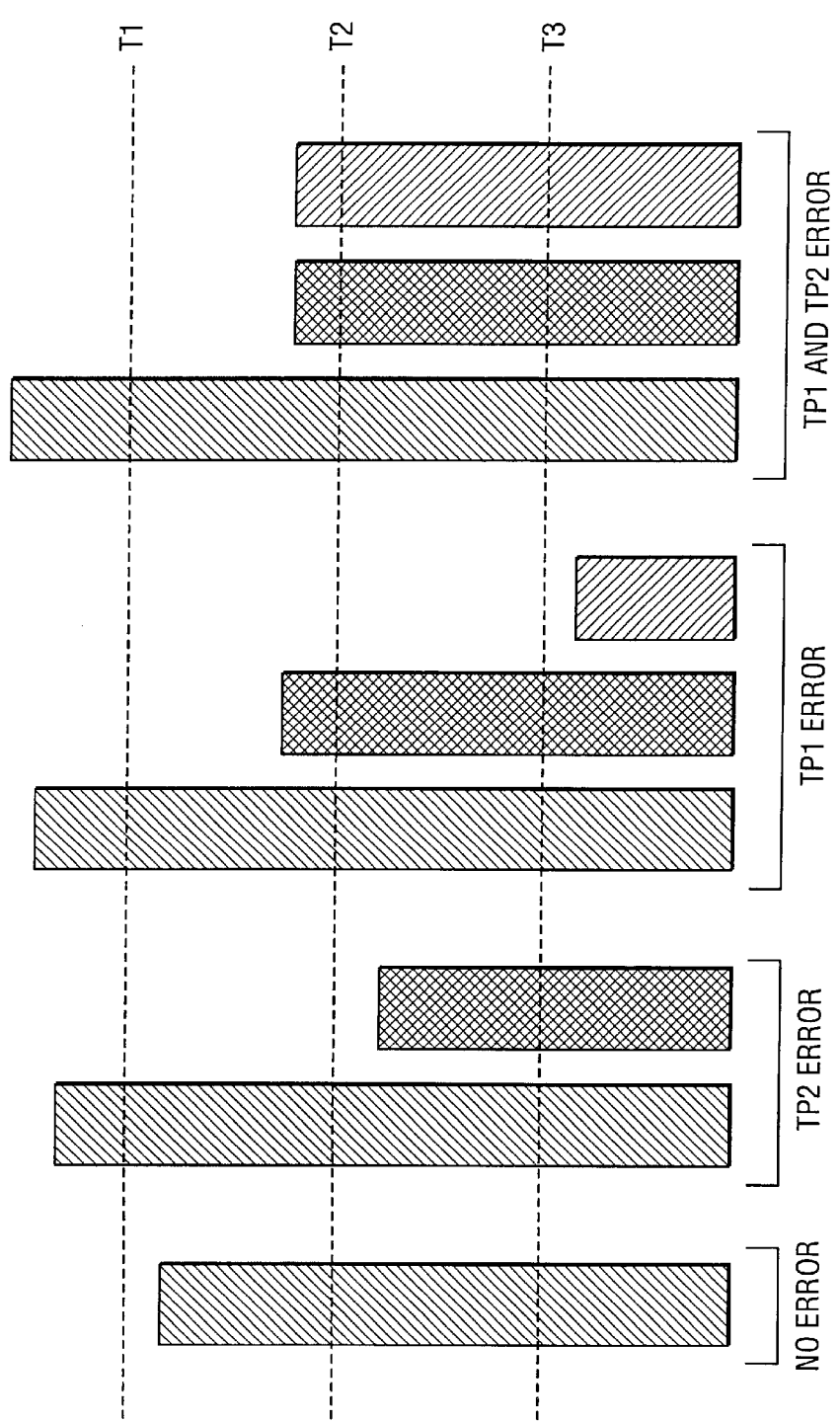
FIG. 3 is a graphical representation of the error conditions found in the arbitration flowchart of FIG. 2.

FIG. 3 illustrates a graphical representation of the selection methods and error conditions determined in the flowchart of FIG. 2. For example, no errors occur when the absolute value difference between the first sensor angle α1 and the second sensor angle α2 is less than the first predetermined threshold difference T1. In the no errors condition, the flowchart returns to starting block 100 after a yes determination at comparison block 108.

In accordance with the invention, a possible fault in connection with the operation of the second position sensor is identified when (1) the first absolute value difference between the first sensor angle α1 and the second sensor angle α2 is greater than the first predetermined threshold difference T1 and (2) the absolute value difference between the first sensor angle α1 and the default sensor angle αd is less than the second predetermined threshold difference T2. In the second position sensor error condition, the flowchart returns to starting block 100 after passing through comparison block 108 and a "yes" determination at comparison block 116. The system selects and applies an output based on the first sensor.

An error in the first position sensor occurs when (1) the absolute value difference between the first sensor angle α1 and the second sensor angle α2 is greater than the first predetermined threshold difference T1, (2) the absolute value difference between the first sensor angle α1 and the default sensor angle αdef is greater than the second predetermined threshold difference T2, and (3) the absolute value difference between the second sensor angle α2 and the default sensor angle αdef is less than the third predetermined threshold difference T3. In the first position sensor error condition, the flowchart returns to starting block 100 after passing through comparison block 108, comparison block 116, and a "yes" determination at comparison block 122. The system selects and applies an output based on the second sensor.

An error in both the first position sensor and the second position sensor occurs when (1) the absolute value difference between the first sensor angle α1 and the second sensor angle α2 is greater than the first predetermined threshold difference T1, (2) the absolute value difference between the first sensor angle α1 and the default sensor angle αdef is greater than the second predetermined threshold difference T2, and (3) the absolute value difference between the second sensor angle α2 and the default sensor angle αdef is greater than the third predetermined threshold difference T3. In the both first position sensor error condition and the second position sensor error condition, the flowchart returns to starting block 100 after passing through comparison block a comparison block 116, and a "no" determination at comparison block 122.

While the best mode for carrying out the invention has been described in detail, those familiar with the art to which this invention relates will recognize various alternative designs and embodiments for practicing the invention as defined by the following claims.

What is claimed:

1. A method of providing a feedback control signal of a throttle valve, the method comprising:
   providing first and second throttle position sensors having a common input, the first and second sensors having first and second outputs; and
   selecting an appropriate feedback control signal by comparing the output signals of the first and second sensors to each other and comparing at least one of the output signals to a known unpowered default position.

2. The method of claim 1, wherein the step of selecting the appropriate feedback control signal further comprises:
   determining if the outputs of the first and second sensors are within an acceptable range.

3. The method of claim 1, wherein the step of selecting the appropriate feedback control signal further comprises:
   determining if the output of the first sensor is within an acceptable range relative to the second sensor.

4. The method of claim 3, wherein the step of selecting the appropriate feedback control signal further comprises:
   determining if the output of the first sensor is within a second acceptable range relative to the default position.

5. The method of claim 4, wherein the step of selecting the appropriate feedback control signal further comprises:
   determining if the output of the second sensor is within a third acceptable range relative to the default position.

6. A system for providing a feedback control signal for an electronic throttle, the system comprising:
   a first sensor having an input signal corresponding to a throttle position, the first sensor having a first output;
   a second sensor having an input signal corresponding to the throttle position, the second sensor having a second output; and
   a control processor electrically connected to the first and second sensors capable of selecting an appropriate feedback control signal by comparing the outputs of the sensors to each other and comparing at least one of the outputs to a known unpowered default position.

7. The system of claim 6, wherein the control processor selects the appropriate feedback signal by determining if the outputs of the first and second sensors are within an acceptable range.

8. The system of claim 6, wherein the control processor selects the appropriate feedback signal by determining if the output of the first sensor is within an acceptable range relative to the second sensor.

9. The system of claim 8, wherein the control processor further selects the appropriate feedback signal by determining if the output of the first sensor is within a second acceptable range relative to the default position.

10. The system of claim 9, wherein the control processor further selects the appropriate feedback signal by determining if the output of the second sensor is within a third acceptable range relative to the default position.

11. The invention as described in claim 4 and comprising when said determining relative to the second sensor determines a difference is not within an acceptable range, initiating an unpowered throttle plate position.

12. The invention as described in claim 11 wherein said determining relative to said default position is delayed a predetermined settling time after said initiating.

13. The invention as described in claim 9 and comprising said control processor when said determining relative to the second sensor determines a difference is not within an acceptable range, initiating an unpowered throttle plate position.

14. The invention as described in claim 13 wherein said control processor determining relative to said default position is delayed a predetermined settling time after said initiating.

* * * * *